United States Patent [19]

Rémus et al.

[11] 4,446,413

[45] May 1, 1984

[54] METHOD FOR REDUCING THE CONSUMPTION OF A STEPPING MOTOR AND DEVICE FOR CARRYING OUT THE METHOD

[75] Inventors: Hans-Jürgen Rémus, St-Aubin; Luciano-Marco Antognini, Lutry, both of Switzerland

[73] Assignee: Asulab S.A., Bienne, Switzerland

[21] Appl. No.: 345,952

[22] Filed: Feb. 4, 1982

[30] Foreign Application Priority Data

Mar. 18, 1981 [CH] Switzerland ........................ 1 826/81

[51] Int. Cl.[3] ............................................ H02K 29/02

[52] U.S. Cl. .................................... 318/696; 368/157

[58] Field of Search ........................ 368/157, 159, 200; 318/696, 685

[56] References Cited

U.S. PATENT DOCUMENTS 4,192,131 3/1980 Hosokawa et al. ................. 368/157

FOREIGN PATENT DOCUMENTS 2944872 3/1981 Fed. Rep. of Germany .

2220919 4/1974 France .

616819 10/1980 Switzerland .

2082806 3/1982 United Kingdom .

OTHER PUBLICATIONS

Actes du 10e Congrès International de Chronometrie, No. 3, 10–14, Sep. 1979, Geneève (CH), (1) Pittet et al., pp. 73–80, (2) Veda et al. pp. 67–72.

Abstract of Japan, vol. 2, No. 106, Jun. 27, 1978, Appln. No. 51–147340 to Seikosha et al.

*Primary Examiner*—G. Z. Rubinson
*Assistant Examiner*—Saul M. Bergmann
*Attorney, Agent, or Firm*—Pollock, Vande Sande & Priddy

[57] ABSTRACT

The method comprises measuring the voltage induced during the driving pulse in the coil by rotation of the rotor, and interrupting the drive pulse in dependence on the measurement made.

The device for carrying out this method comprises a circuit for measuring the induced voltage, a circuit for comparison with a reference value and a circuit for calculating the duration of the drive pulse.

16 Claims, 18 Drawing Figures

METHOD FOR REDUCING THE CONSUMPTION OF A STEPPING MOTOR AND DEVICE FOR CARRYING OUT THE METHOD

BACKGROUND OF THE INVENTION

The present invention relates to a method for reducing the consumption of a stepping motor by automatically adapting the duration of each driving pulse supplied thereto to the load which is to be driven by the motor in response to said driving pulse.

The present invention also relates to a device for carrying out the method.

Stepping motors are used in many devices in which a mechanical member is to be moved by a given amount in response to an electrical signal. They are used in particular in electronic timepieces in which the time display hands must be moved by a given distance in response to pulses of a highly precise period, which are supplied by a time base.

In such timepieces, the major part of the power supplied by the electrical power source, which is generally a battery, is consumed by the stepping motor. As the space available in timepieces is greatly restricted, it is important for the level of consumption of the motor to be limited as far as possible, in order to increase the service life of the battery or, for a given service life, to be able to reduce the space occupied thereby.

In most of the present-day timepieces, the duration of the driving pulses which are supplied to the motor at regular intervals is constant. The duration of the driving pulses is so selected as to ensure proper operation of the motor even under the worst conditions, that is to say, with a low battery voltage, while driving the calendar mechanism, when subjected to shocks or in the presence of an external magnetic field, etc. As such poor conditions occur only rarely, the motor is over-powered in most cases.

It is possible to substantially reduce the power consumption of the motor by adapting the power supplied by the driving pulses to the instantaneous load to be driven by the motor and to the supply voltage.

One solution to this problem comprises providing a pulse shaping circuit capable of producing pulses of different durations and a device for detecting rotation or non-rotation of the motor. The duration of the driving pulses applied to the motor is progressively reduced until the device detects that a step has not been performed. A catch-up pulse is then applied to the motor and the energy of the normal driving pulses is fixed at a higher value which is maintained for a certain period of time. If the motor has rotated normally during that period, the duration of the pulses is again reduced. Such a design does not provide for the driving pulses to be permanently and rapidly adapted to the load on the motor. In addition, this slow adaptation procedure and the production of catch-up pulses when the motor does not perform a stepping movement mean that the power consumption is higher than necessary.

In order to overcome this disadvantage, it is known to provide devices which adapt the duration of each driving pulse to the load to be entrained by the motor in response to the driving pulse.

U.S. Pat. No. 3,500,103, describes a device for detecting the movement of the movable member of the motor by way of the voltage induced in a detection coil which is separate from the drive coil, and which interrupts the driving pulse when the movable member reaches either a given position or a given speed.

U.S. Pat. No. 3,855,781 proposes solutions according to which the position of the rotor is detected by measuring the voltage induced in an auxiliary coil or caused by the deformation of a piezoelectric element under the action of the teeth of one of the wheels of the wheel-train which is driven by the motor. That voltage is used to interrupt the driving pulse.

The devices described in the two patents referred to above require additional elements for operation thereof, which makes them expensive and complicated to use.

French Pat. No. 2 200 675 proposes detecting the variation in current in the actuating coil of the motor and interrupting the driving pulse when the current passes through a minimum. The limits of this detection operation are imposed by the form of the current which depends on the time constant of the circuit, the counter-electromotive force induced, and the load on the motor. In some cases, the current minimum may disappear, which renders the control device inoperative.

In addition, U.S. Pat. No. 4,114,364 describes a circuit for controlling the duration of the driving pulses in dependence on the load on the motor, which comprises means for detecting the current in the actuating coil and means for interrupting the pulse when that current reaches a value equal to the ratio between the supply voltage of the coil and its d.c. resistance, that is to say, when the rotor has concluded its stepping motion. Also provided is the possibility of interrupting the pulse before the current has reached that value.

All the above-described devices use measurement of a physical parameter such as the speed or position of the rotor or such as the current flowing in the coil. The measurement made is used directly or by comparison with a reference value, to control interrupting the driving pulse. Now, none of the above-mentioned physical parameters gives an absolute indication as to the precise moment at which the driving pulse is to be interrupted in order for the power consumption of the motor really to be at a minimum. All these devices therefore cause the driving pulse to be interrupted at an arbitrarily selected moment which is generally not the optimum moment. In practice, these devices must take account of safety factors such that, most of the time, the motor consumes too much energy or does not operate safely.

SUMMARY OF THE INVENTION

This disadvantage is overcome by the method according to the invention which comprises the steps of measuring the voltage induced in the coil of the motor by the movement of the rotor, and interrupting the driving pulse in dependence on said measurement of the induced voltage.

The voltage induced in the coil by movement of the rotor is closely linked to the mechanical power produced by the motor, by the relationship:

$$\int Ur.i.dt = \int C.w.dt$$

which $U_r$ in this induced voltage, i is the current flowing in the coil, C is the torque produced by the motor and w is the angular speed of the rotor.

The second term of the foregoing equation represents the total mechanical power produced by the motor during one of its steps, and the first term represents the electrical energy which is converted into the mechanical energy by the motor.

The above-indicated relationship shows that the voltage $U_r$ induced in the coil by rotation of the rotor is directly linked to the mechanical power produced by the motor. The current i which is also involved in that relationship and all the other physical parameters which can be measured on a motor during its rotation also depend on factors which are not linked to the mechanical power mentioned above, such as the voltage of the power source and the ohmic resistance of the coil. This means that measuring the induced voltage $U_r$ constitutes the most appropriate method for accurately and safely determining the optimum moment for interrupting the driving pulse.

It should be noted that the voltage induced in the coil by movement of the rotor is only a part of the total voltage induced, which is referred to in French Pat. No. 2 200 675 and the maximum of which coincides with the minimum of the current flowing in the coil, when that minimum exists. The other part of the total voltage induced is formed by the self-induction voltage generated in the coil by the variations in the current flowing therein.

As the above-mentioned self-induction voltage is not directly linked to the power supplied by the motor, the total voltage induced does not constitute a suitable parameter for determining the optimum moment for interrupting the driving pulse. Added to that is the above-mentioned fact that the current in the coil does not always have a minimum. In addition, when that minimum is present, it is not sufficiently clearly marked for it to be detected accurately.

BRIEF DESCRIPTION OF THE DRAWINGS

The invention will now be described in greater detail with reference to the accompanying drawing in which.

DESCRIPTION OF THE PREFERRED EMBODIMENTS

Figure 1:
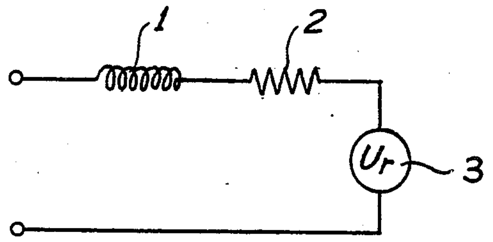
FIG. 1 shows the equivalent diagram of a stepping motor.

FIG. 1 shows the equivalent diagram of a stepping motor. The coil of the motor is represented by a coil 1 with an inductance L and a resistance of zero, and a resistor 2 whose resistance R is equal to the resistance of the motor coil. The source of voltage induced in the coil by rotation of the rotor is diagrammatically indicated by a voltage source 3. The value of the induced voltage is designated $U_r$.

Figure 2A:
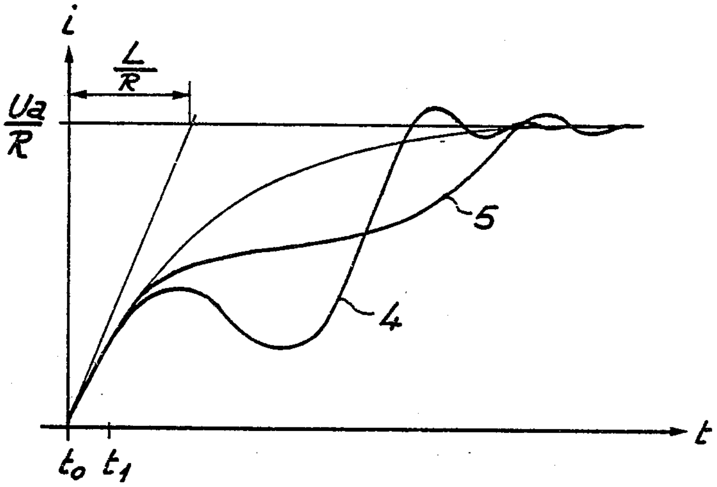
FIG. 2a shows the variation in the current in the coil of the motor under two motor load situations.

Curves 4 and 5 in FIG. 2a, which are well known, illustrate the variation in the current i in the coil of the motor in dependence on time during the driving pulse in situations where the load driven by the motor is low and high respectively.

Figure 2B:
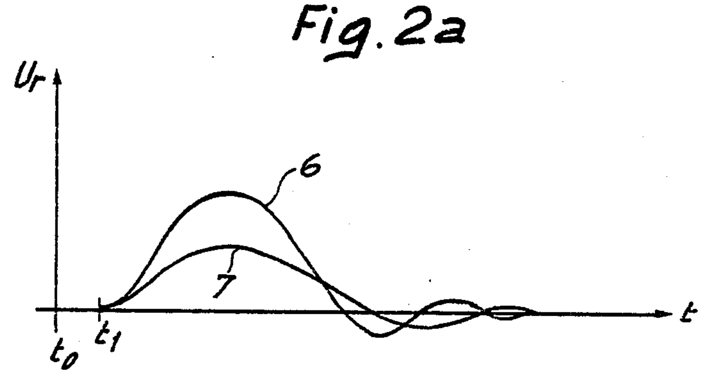
FIG. 2b shows the variation in the voltage induced in the coil by rotation of the rotor under the same load conditions.

Curves 6 and 7 in FIG. 2b illustrate, under the same load conditions, the variation in the voltage $U_r$ as measured by a device which will be described hereinafter.

Curves 4 and 5 show that, just after the moment T0 at which the driving pulse is initiated, the current in the coil increases in accordance with an exponential law, with a time constant equal to L/R, irrespective of the load to be driven by the motor. The rotor is still stationary and the voltage $U_r$ is zero (FIG. 2b).

The rotor begins to rotate at moment t1. The source 3 begins to supply the voltage $U_r$ induced by rotation of the rotor, and the current i in the coil therefore ceases to be subject to an exponential variation. It follows a curve which depends on the load driven by the motor, curves 4 and 5 being two examples thereof. The voltage $U_r$ follows a curve which also depends on the load driven by the motor. Curve 6 in FIG. 2b corresponds to curve 4 in FIG. 2a while curve 7 corresponds to curve 5.

Irrespective of the load driven by the motor, the voltage $U_r$ passes through a maximum before passing through zero at the moment at which the rotor passes through the position that it would finally assume after a few oscillations, if the driving pulse would not be interrupted.

The voltage $U_r$ then oscillates about zero until the rotor stops.

There are several possible ways of making use of the information supplied by measuring the voltage $U_r$. Like the other physical parameters which can be measured on the motor, that voltage $U_r$ does not have a particular point which coincides precisely with the moment at which the driving pulse is to be interrupted in order to have minimum motor consumption.

However, measurements have shown that, irrespective of the kind of information which is extracted from the measurement of that voltage $U_r$, that information is very directly linked to the optimum duration of the driving pulse. The law linking that information and that duration is always a simple law which permits the information extracted from measurement of the voltage $U_r$ to be easily put to use.

Among the information which can be extracted from measurement of the voltage $U_r$, mention may be made of the position in time or of the amplitude of the maximum of the above-mentioned voltage $U_r$, the time taken by that voltage to reach a certain threshold on its rising edge or its falling edge, the derivative or the integral thereof, etc. Tests have shown that the information given by the time taken by the voltage $U_r$ to reach a certain threshold is easier to extract from measurement of the voltage $U_r$ and to put to use for determining the optimum duration of the driving pulse.

Figure 3:
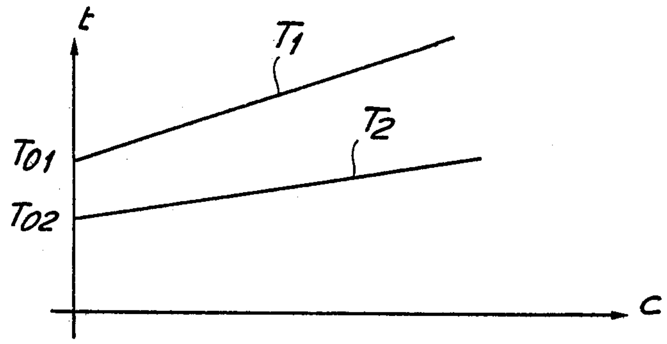
FIG. 3 shows the variation in the duration of the minimum driving pulse and the time taken by the induced voltage to reach a given threshold, depending on the load driven by the motor.

FIG. 3 illustrates the variation in the minimum duration T1 of the driving pulse required to rotate a motor in dependence on the torque C that the motor is to produce. That variation is substantially linear and has a fairly low degree of dispersion for a given type of motor. It can be expressed by the following relationship:

$$T1 = T01 + a.C$$

in which T01 is the minimum duration of the driving pulse for a zero load and a is the slope of the straight line.

The variation in the time T2 taken by the voltage $U_r$ to reach a given threshold $U_s$ is also shown in FIG. 3. It is also substantially linear and may be expressed by the following relationship:

$$T2 = T02 + b.C$$

in which T02 is the time taken by the voltage $U_r$ to reach the threshold voltage $U_s$ in the absence of load and b is the slope of the straight line.

It is interesting to note that, in a fairly wide range of values in respect of the threshold voltage $U_s$, the relationship between T2 and C remains linear. The terms T02 and b obviously depend on the threshold voltage $U_s$ selected.

The relationship between the times T1 and T2 is also linear and is given by the equation:

$$T1 = \frac{a}{b}\left(T2 - T02 + \frac{b}{a}\,T01\right)$$

In that equation, the terms a, b, T01 and T02 are constants for a given type of motor and for a given threshold voltage $U_s$. It can therefore be written as follows:

$$T1 = k\,(T2 + K) \qquad (1)$$

$$\text{with } k = \frac{a}{b} \text{ and } K = \frac{b}{a}\,T01 - T02$$

Figure 4:
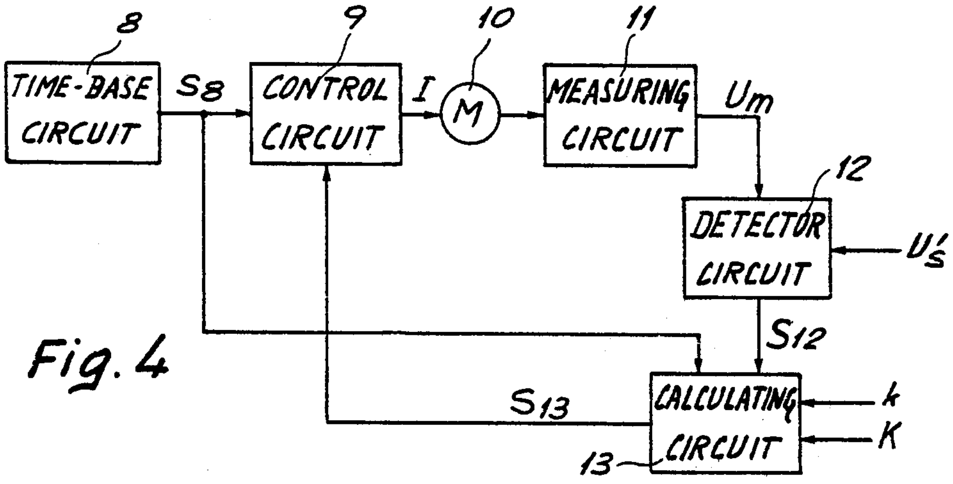
FIG. 4 is a block circuit diagram of an embodiment of the device according to the invention.
Figure 5:
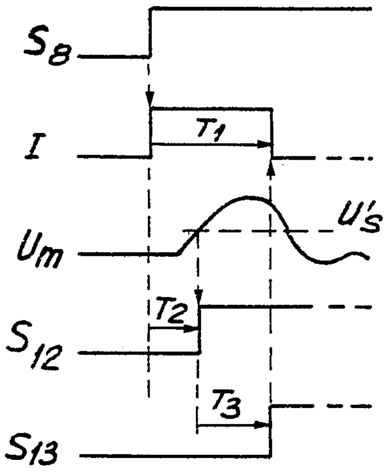
FIG. 5 illustrates the mode of operation of the device of FIG. 4.

The terms k and K can be easily calculated from measuring the times T01 and T02 and the times T1 and T2 for a known load. Once they have been determined, for a particular type of motor, they can be used in the circuit for controlling that type of motor. FIG. 4 shows the basic circuit diagram of such a circuit. FIG. 5 shows the variation in the signal at some points in FIG. 4.

In FIG. 4, reference numeral 8 denotes a circuit the output of which supplies a signal S8 to a control circuit 9 each time when the motor 10 is to advance by one step.

By way of non-limiting example, the circuit 8 may comprise the oscillator and the frequency divider chain of an electronic watch, and it can be so arranged as to supply other periodic signals at various frequencies. Those signals will be described hereinafter.

In response to the signal S8, the control circuit 9 supplies the driving pulse I to the motor 10. When the motor 10 is a stepping motor such as is generally used in watches, correct polarity of the driving pulse I is also determined by the circuit 9.

A measuring circuit 11 is connected to the motor 10. It is so arranged, in a manner in respect of which examples will be set out hereinafter, as to supply a voltage $U_m$ proportional to the voltage $U_r$ induced in the coil of the motor by rotation of the rotor.

The measured voltage $U_m$ is applied to a detector circuit 12 which supplies a signal S12 at the moment that the voltage $U_m$ exceeds a suitably selected reference voltage $U_s'$.

A calculating circuit 13, embodiments of which will be described by way of example hereinafter, supplies a signal S13 a certain time after having received the signal S12. The moment at which the signal S13 is supplied depends on the time which has elapsed between the beginning of the driving pulse and the advent of the signal S12, and on the value of the two constants k and K which are also supplied in a suitable form to the calculating circuit 13. The signal S13 is used by the control circuit 9 to interrupt the drive pulse I.

Figure 6:
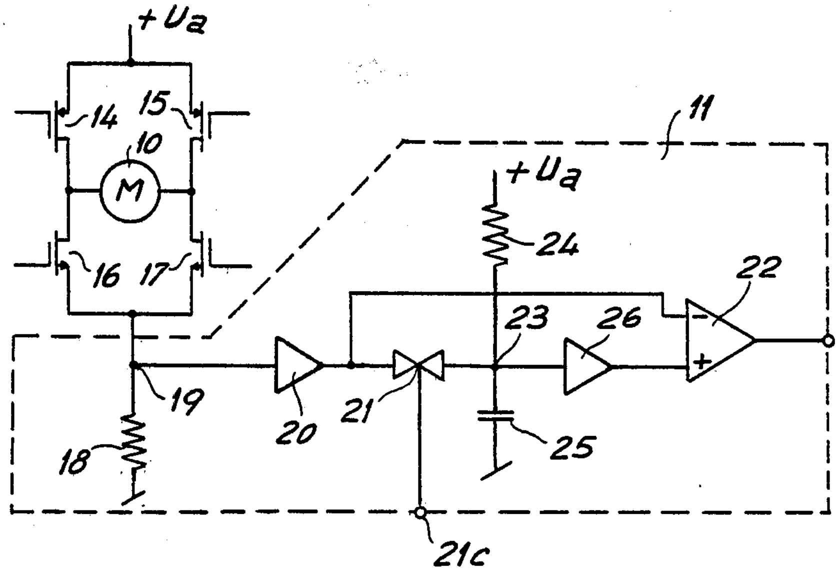
FIG. 6 is a circuit diagram of a first embodiment of a circuit for measuring the voltage induced in the coil by rotation of the rotor.

FIG. 6 shows the basic diagram of an example of the circuit 11 for measuring the voltage $U_r$. Like the other circuits which will be described hereinafter, the circuit 11 is supplied by a voltage source (not shown). The voltage source supplies a positive voltage $+U_a$ and a negative voltage $-U_a$ with respect to a middle point which is connected to the ground of the circuit. The voltage $-U_a$ is intended in particular to feed the differential amplifiers used in those circuits.

FIG. 6 shows the motor 10 connected in conventional manner in a bridge circuit comprising four MOS transistors 14,15,16 and 17, forming part of the control circuit 9 in FIG. 4. The transistors 14 and 15 which are of p type have their sources connected to the positive terminal $+U_a$ of the power source (not shown). The transistors 16 and 17 which are of n type have their source connected to the ground of the circuit, by way of a low-resistance measuring resistor 18 forming part of the measuring circuit 11 in FIG. 4. The drains of the transistors 14 and 16 are connected to one of the terminals of the motor 10 and the drains of the transistors 15 and 17 to the other.

The gates of the four transistors 14 to 17 are connected to a logic circuit (not shown in FIG. 6) which produces the logic signals required for controlling those transistors. An example of the logic circuit will be described below.

The measuring circuit 11 comprises an amplifier 20, the input of which is connected to the point 19 which is common to the sources of the transistors 16 and 17 and to the resistor 18. The gain of the amplifier 20 is so selected that its output voltage U20 is equal to the supply voltage $+U_a$ when the current i flowing in the motor coil is equal to $U_a/R$.

The output of the amplifier 20 is connected to the input of a transmission gate 21 and to the inverting input of a differential amplifier 22. The gate 21 is controlled by a logic signal 21C which is produced for example by the circuit 8 in FIG. 4 and which will be described hereinafter.

The output of the gate 21 is connected to the junction point 23 of a resistor 24 having a value R24 and a capacitor 25 having a capacitance C25. The point 23 is also connected by way of an amplifier 26 to the non-inverting input of the differential amplifier 22.

The sole purpose of the amplifier 26 is to avoid loading the R-C circuit 24–25 by the input of the amplifier 22. The gain of the amplifier 26 is one.

The circuit formed by the resistor 24 and the capacitor 25 is connected between the terminal $+U_a$ of the power supply source and ground. The value R 24 of the resistor 24 and the capacitance C25 of the capacitor 25 are so selected that:

$$R24.C25=(L/R)$$

in which L and R are the inductance and the resistance of the motor coil, as referred to above.

When the signal 21C is at logic state "0", the gate 21 is non-conducting. The voltage at the point 23 therefore varies exponentially towards its asymptotic value which is equal to the supply voltage $+U_a$, with the same time constant $\tau=R$ 24.C25 as the current which would flow in the coil of the motor if the rotor were blocked, that is to say, if the voltage $U_r$ were zero.

When the signal 21C is at logic state "1", the gate 21 is conducting and the voltage at point 23 is equal to the output voltage of the amplifier 20.

Figure 7:
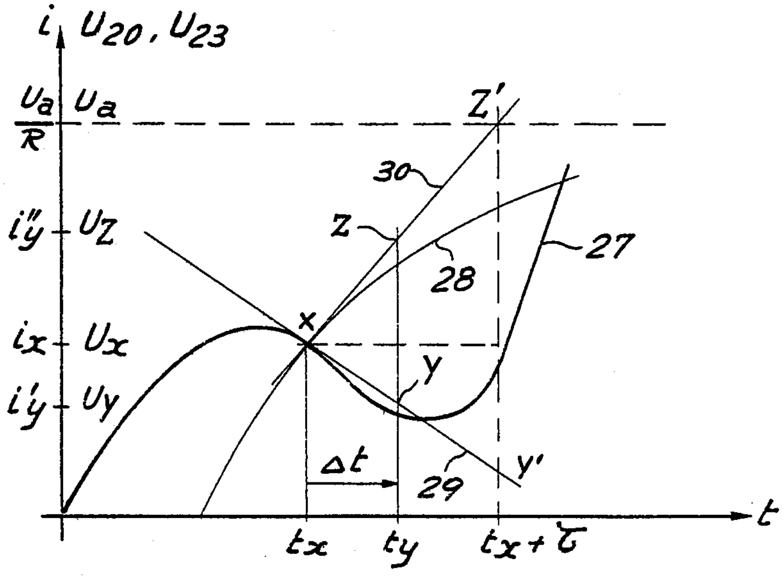
FIG. 7 shows the principle of operation of the circuit of FIG. 6.

FIG. 7 shows the principle of operation of that circuit. In FIG. 7, curve 27 represents the variation in the output voltage U20 of the amplifier 20, during a driving pulse. The curve 27 is therefore an image of the current i flowing in the coil of the motor 10 during a driving pulse.

As long as the gate 21 is conducting the voltage U23 at point 23 follows the same curve 27. The output voltage U22 of the differential amplifier 22 therefore remains at zero. If, at any moment $t_x$, the gate 21 becomes non-conducting, the voltage U20 continues to follow the curve 27. On the other hand, the voltage U23 begins to follow the curve 28 which is the exponential curve passing through point X, with a time constant $\tau=$R24.C25 and an asymptotic value equal to +Ua. The curve 28 is precisely the same as that which would be followed by the voltage U20 if, at moment $t_x$, the rotor were abruptly stopped, which would make the voltage $U_r$ equal to zero. It is therefore an image of the current i' which, under those conditions, would flow in the coil of the motor.

As the voltage U20 and U23 are applied to the inverting and direct inputs of the differential amplifier 22, the output voltage U22 of the amplifier is therefore U23−U20.

It will be shown hereinafter that, during a short moment after the gate 21 has become non-conducting, the voltage U22=U23−U20 is proportional to the voltage $U_{rx}$, that is to say, to the value of the voltage induced in the coil of the motor by rotation of the rotor at the moment $t_x$.

The voltage U20 is proportional to the current i flowing in the coil during a driving pulse. Generally, that current i can be expressed by the following relationship:

$$i(t) = \frac{U_a - U_r - L\frac{di}{dt}}{R} \quad (2)$$

which is readily deduced from the circuit shown in FIG. 1 when the voltage $+U_a$ is applied to the motor by its control circuit (not shown in FIG. 1).

At each point on the curve 27, the slope thereof is given by the following equation which is readily deduced from equation (2):

$$\frac{di}{dt} = \frac{U_a - U_r - R \cdot i}{L}$$

At point X, the slope is given by:

$$\left.\frac{di}{dt}\right|_{t=t_x} = \frac{U_a - U_{rx} - R \cdot i_x}{L}$$

in which $U_{rx}$ and $i_x$ are respectively the values of $U_r$ and i at point X.

The tangent 29 to the curve 27 at the point X therefore has the following equation:

$$i'(t) = \frac{U_a - U_{rx} - R \cdot i_x}{L} \cdot t + C1 \quad (3)$$

in which C1 is an integration constant which can be calculated, taking account of the following condition:

$$i'=i_x \text{ for } t=t_x$$

With all calculations performed, the equation of the tangent 29 becomes:

$$i'(t) = i_x + \frac{U_a - U_{rx} - R \cdot i_x}{L}(t - t_x)$$

At point Y, at which $t=t_y$, we have:

$$i'_y = i_x + \frac{U_a - U_{rx} - R \cdot i_x}{L}(t_y - t_x) \quad (4)$$

It has been seen above that if, at moment $t_x$, the rotor were abruptly stopped, which would make the voltage $U_r$ equal to zero, the current i flowing in the coil, after that moment $t_x$, would follow an exponential curve of which the curve 28 is an image.

In this case, equation (2) above would become:

$$i(t) = \frac{U_a - L\frac{di}{dt}}{R} \quad (5)$$

The same lines of reasoning as set out above show that the ordinate $i''_y$ of the point Z disposed at $t=t_y$ on the tangent 30 to the exponential curve 28 is equal to:

$$i''_y = i_x + \frac{U_a - R \cdot i_x}{L}(\Delta t) \quad (6)$$

in which $\Delta t=t_y-t_x$.

By substracting above equation (4) from equation (6), we have:

$$i''_y - i'_y = \frac{U_{rx}}{L}(\Delta t) \quad (7)$$

or $$U_{rx} = L \cdot \frac{i''_y - i'_y}{\Delta t}$$

It will be seen therefore that, at each point X on the curve 27, the voltage $U_{rx}$ induced in the coil by rotation of the rotor is proportional to the segment Y−Z, for a given measuring time $\Delta t=t_y-t_x$.

In particular, for $\Delta t=\tau$, $U_{rx}$ is equal to the length of the segment Z'−Y' in FIG. 7 in which Y' and Z' are the points of the tengents 29 and 30 which are located at the abscissa $(t_x+\tau)$. The ordinate of the point Z' is equal to $U_a/R$ which is the asymptotic value of the exponential curve 28.

If Δt is selected at a sufficiently short value, the tangents 29 and 30 can be replaced by the curves 27 and 28. The current i' can be replaced by the current $i_y$ and the current $i''_y$ can be replaced by the current which would flow in the coil at the moment $t_y$ if the induced voltage $U_r$ were made equal to zero at the moment $t_x$.

The voltage U23 being proportional to the current which would flow in the coil after the moment $t_x$ if the voltage induced were made zero at that moment $t_x$, that equation (7) set out above can be written as follows:

$$U_{rx} = J \cdot \frac{U23_y - U20_y}{\Delta t}$$

in which J is a proportionality factor which depends on the value of the resistor 18 and on the gain of the amplifier 22, and $U23_y$ and $U20_y$ are the values of the voltages U23 and U20 at the moment $t_y$.

Figure 8A:
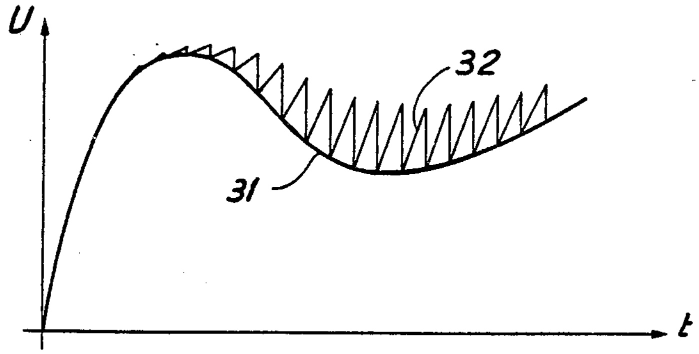
FIG. 8 shows the mode of operation of the circuit of FIG. 6.
Figure 8B:
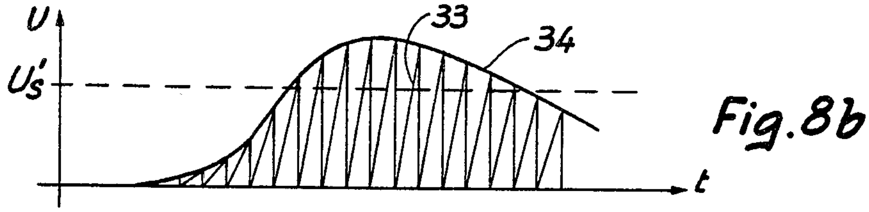
Figure 8C:

FIGS. 8*a* and 8*b* show the mode of operation of the circuit shown in FIG. 6 when the gate 21 is controlled by signal 21C such as that shown in FIG. 8*c*.

In the present example, the gate 21 is conducting when the signal 21C is at logic state "1" and non-conducting when the signal 21C is at logic state "0". The control signal 21C is formed for example by pulses having a period of 250 microseconds approximately which are at logic state "1" during some microseconds and at logic state "0" for the remainder of the time. The gate 21 therefore becomes conducting for a few microseconds every 250 microseconds, and it is non-conducting for the rest of the time.

In FIG. 8*a*, the curve 31 again represents the voltage U20 which is an image of the current i in the coil. The sawtooth curve 32 which is superimposed thereon represents the voltage U23. Whenever the gate 21 becomes conducting, that is to say when the signal 21C is at state "1", the voltage U23 becomes equal to the voltage U20. When the gate 21 is non-conducting, that is to say when the signal 21C is at state "0", the voltage U23 varies in accordance with a curve such as the exponential curve 28 shown in FIG. 7.

The sawtooth curve 33 in FIG. 8*b* shows, on a different scale from that shown in FIG. 8*a*, the output voltage U22 of the differential amplifier 22. The voltage U22 is equal to zero whenever the gate 21 is conducting and it is equal to the difference between the voltages U23 and U20 when the gate 21 is non-conducting. As the periods of time during which the gate 21 is non-conducting are equal to each other, the curve 34 which is the envelope of the curve 33 is an image of the voltage $U_r$ induced in the coil of the motor by rotation of the rotor.

The envelope 34 could be produced by filtering the voltage U22 in a low-pass filter. The output signal of the filter could be amplified in an amplifier, the gain of which would be selected, taking into account all the proportionality factors introduced into the circuit of FIG. 6 by the choice of the resistor 18, of the gain of the amplifier 20 and of the period of the control signal 21C. The output signal of that amplifier would then be equal to the induced voltage $U_r$. However, such filtering and amplification are not necessary. The voltage U22 itself can be used directly as the measuring voltage $U_m$ in the circuit of FIG. 4. The voltage $U_s'$ to which the voltage $U_m$ is compared in the circuit 12 in FIG. 4 must obviously be selected, taking account of the above-mentioned proportionality factors.

It should be noted that the voltage U22 is independent of the supply voltage $U_a$ since the voltages U23 and U20 are both proportional to the voltage $U_a$.

It has been shown above that the difference between the currents $i''_y$ and $i'_y$ is proportional to the voltage $U_{rx}$ induced in the coil of the motor by rotation of the rotor at the time $t_x$. The FIG. 7 shows that that difference can be written as follows:

$$i''_y-i'_y=i''_y-i_x+i_x-i'_y$$

In terms of voltage, that equation can be written as follows:

$$U_z-U_y=U_z-U_x+U_x-U_y \tag{8}$$

FIG. 7 also shows that:

$$U_z - U_x = (U_a - U_x)\frac{\Delta t}{\tau}$$

Above equation (8) can therefore be written as follows:

$$U_z - U_y = (U_a - U_x)\frac{\Delta t}{\tau} + U_x - U_y \tag{9}$$

This expression shows that the voltage $U_{rx}$ which is proportional to $(U_z-U_y)$ can be measured without measuring the voltage $U_z$ itself.

Figure 9:
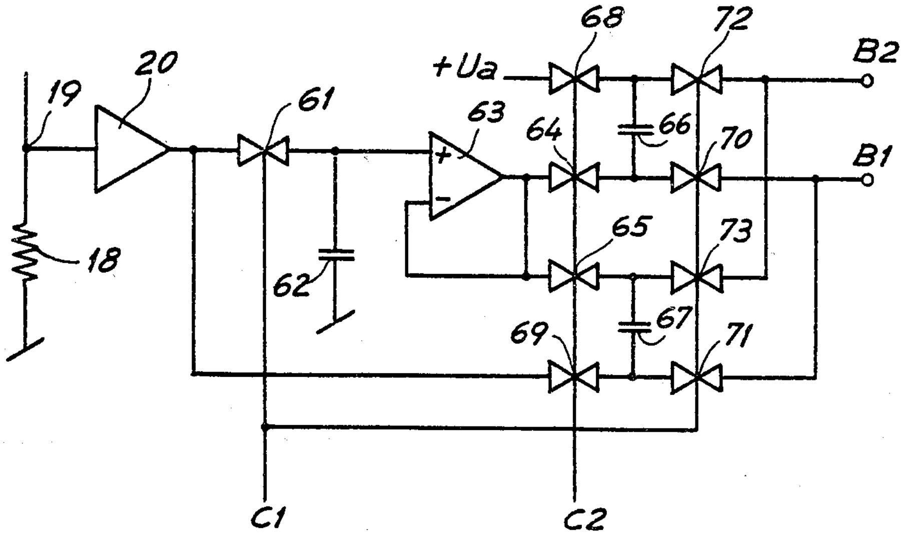
FIG. 9 is a circuit diagram of a second embodiment of a circuit for measuring the voltage induced in the coil by rotation of the rotor.

FIG. 9 shows the basic circuit diagram of a measuring circuit 11 (see FIG. 4) for supplying a voltage $U_{m1}$ which is proportional to $U_{rx}$ on the basis of equation (9) above.

In FIG. 9, the resistor 18 for measuring the current flowing in the motor (not shown in FIG. 9) and the amplifier 20, the output voltage of which is an image of that current, are identical to the resistor 18 and the amplifier 20 in FIG. 6.

The output of the amplifier 20 is connected by way of a transmission gate 61 to a first terminal of a capacitor 62 having a capacitance C62, and to the non-inverting input of a differential amplifier 63. The second terminal of the capacitor 62 is connected to the ground of the circuit.

The output of the amplifier 63 is connected to its inverting input. The gain of that amplifier is therefore equal to one. Its output is also connected, by way of two transmission gates 64 and 65, to the first terminals of two capacitors 66 and 67, having capacitances C66 and C67.

The second terminal of the capacitor 66 is connected by way of a transmission gate 68 to the terminal $+U_a$ of the power supply source, and the second terminal of the capacitor 67 is connected to the output of the amplifier 20 by way of a transmission gate 69.

The first terminal of the capacitor 66 and the second terminal of the capacitor 67 are connected to a first output terminal of the circuit, denoted by B1, by way of transmission gates 70 and 71 respectively. The second terminal of the capacitor 66 and the first terminal of the capacitor 67 are connected to a second output terminal of the circuit, denoted by B2, by way of transmission gates 72 and 73 respectively.

The gates 61 and 70 to 73 are controlled together by a signal denoted by C1, and the gates 64,65,68 and 69 are controlled together by a signal denoted by C2.

Figure 10:
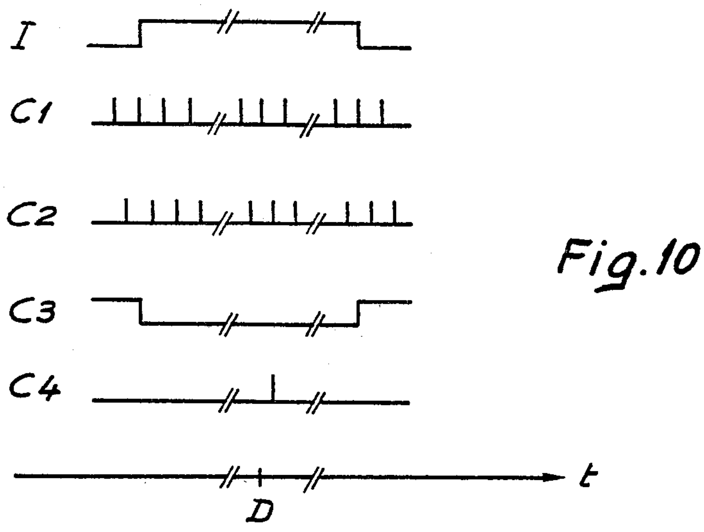
FIG. 10 illustrates the mode of operation of the circuit of FIG. 9.

The signal C1 and C2 which can be supplied for example by the circuit 8 in FIG. 4 and which are shown in FIG. 10 are of identical periods of 0.5 milliseconds for example and of durations which are also identical and which are short with respect to their period, for example 30 microseconds. Each of them appears in the middle of the period of the other. FIG. 7 can also be referred to, for understanding the mode of operation of the circuit shown in FIG. 9.

When, at a moment $t_x$, the signal C1 switches the gate 61 into its conducting state, the capacitor 62 is charged to the voltage $U_x$ which is proportional to the current $i_x$ flowing in the coil at that moment. The voltage $U_x$ appears at the output of the amplifier 63. The function of the gates 70 to 73 which are also put into a conducting condition at that moment will be discussed hereinafter.

At the moment $t_y$, the signal C2 switches the gates 64,65,68 and 69 into their conducting condition. The voltage $U_x$ which is stored by the capacitor 62 and the amplifier 63 is therefore applied to the first terminal of the capacitors 66 and 67. At the same time, the voltage $U_a$ is applied to the second terminal of the capacitor 66 and a voltage which is proportional to the current flowing in the coil of the motor at that moment $t_y$ is applied to the second terminal of the capacitor 67. As the time $\Delta t$ between the moments $t_x$ and $t_y$ is short, that voltage can be considered as being the voltage $U_y$ in FIG. 7. At that moment $t_y$, the capacitor 66 is therefore charged to a voltage $U66=U_a-U_x$ and the capacitor 67 is charged to a voltage $U67=U_x-U_y$.

The charges Q66 and Q67 stored in that capacitors are therefore respectively:

$$Q66=C66(U_a-U_x)$$

and $$Q67=C67(U_x-U_y)$$

The following pulse C1 switches the gates 70 to 73 into their conducting states. During that pulse C1, the capacitor 66 and 67 are therefore connected in parallel with the output terminals B1 and B2 of the circuit. The voltage $U_{m1}$ which then appears at those terminals is equal to:

$$U_{m1} = \frac{Q66 + Q67}{C66 + C67} = \frac{1}{C66 + C67}\,[C66(U_a - U_x) + C67(U_x - U_y)] \tag{10}$$

If the capacitors 66 and 67 are so selected that $C66=C67\ (\Delta t/\tau)$, the equation (10) above can be written as follows:

$$U_{m1} = \frac{1}{1 + \frac{\Delta t}{\tau}}\left[(U_a - U_x)\frac{\Delta t}{\tau} + U_x - U_y\right] \tag{11}$$

The expression between brackets is proportional to the voltage $U_{rx}$ (see equation (9) above). The voltage $U_{m1}$ is therefore also proportional to $U_{rx}$.

It should be noted that, with that circuit, the voltage $U_{m1}$ which is representative of the voltage $U_r$ induced at the moment $t_x$ in the coil by rotation of the rotor appears at the output of the circuit only at a moment $t_x+2\Delta t$. That delay does not cause difficulties since $\Delta t$ is short.

It should also be noted that one or other of the output terminals B1 and B2 can be connected to the ground of the circuit, without changing the mode of operation thereof.

In the circuit shown in FIG. 6, the accuracy of the measured value depends directly on the accuracy of the values of the resistor 24 and the capacitor 25. It is well known that, in mass production, it is difficult to achieve a high degree of accuracy in such components. The circuit shown in FIG. 9 does not suffer from the disadvantage. The accuracy of the measured voltage depends only on the ratio between the capacitances of the capacitors 66 and 67. Now, even in large-scale mass production, that ratio can be guaranteed, with a high degree of accuracy.

However, the circuit shown in FIG. 9 suffers from another minor disadvantage, like the circuit shown in FIG. 6. For the purposes of making the above-indicated calculations and for following through the above-indicated lines of reasoning, it was assumed that the transistors 14 to 17 of the motor control circuit (see FIG. 6) do not have any internal resistance when they are in a conducting condition. In actual fact, the internal resistance of the transistors is not zero and the asymptote of the exponential curves such as the curve 28 in FIG. 7 is not disposed at the ordinate $U_a$ but at an ordinate $$U_a' = U_a - \Sigma R_T \cdot \frac{U_a}{R + \Sigma RT}.$$

In that expression, R represents the value of the measuring resistor 18, and $\Sigma R_T$ represents the sum of the internal resistances of the transistors when conducting. As such resistances differ from one transistor to the other and are also variable in dependence on the current flowing through the transistors, the above-indicated value $U_a'$ cannot be determined with precision.

Figure 11:
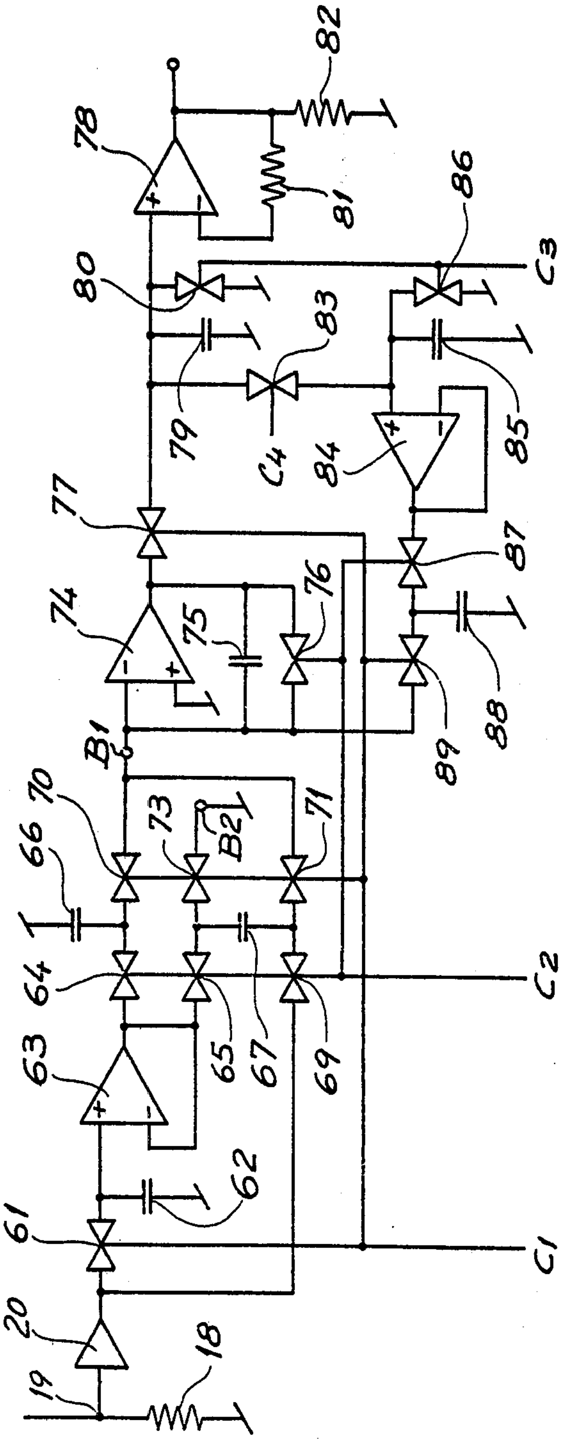
FIG. 11 is a diagram of a third embodiment of a circuit for measuring the voltage induced in the coil by rotation of the rotor.

The error in respect of measurement of the value of the voltage induced by rotation of the motor, which is caused by replacing $U_a'$ by $U_a$ is not very serious. Nonetheless, FIG. 11 shows the diagram of a third measuring circuit which eliminates that source of error.

All the components described with reference to FIG. 9 are also to be found in FIG. 11, except for the gates 68 and 72 which do not appear in this circuit diagram. In addition, the second terminal of the capacitor 66 and the output terminal B2 are directly connected to ground.

The output terminal B1 of the circuit shown in FIG. 9 is connected to the inverting input of a differential amplifier 74. The non-inverting input of the amplifier 74 is connected to ground. The output of the amplifier 74 is connected to its inverting input by way of a capacitor 75 connected in parallel with a transmission gate 76. The output of the amplifier 74 is also connected through a transmission gate 77 to the non-inverting input of a differential amplifier 78. A capacitor 79 and a transmission gate 80 are connected in parallel between the non-inverting input of the amplifier 78 and ground.

The output of the amplifier 78 forms in that example the output of the measuring circuit 11. That output is connected to the inverting input of the amplifier 78 by way of a resistor 81 and to the ground of the circuit by way of a resistor 82.

The non-inverting input of the amplifier 78 is also connected by way of a transmission gate 83 to the non-inverting input of a differential amplifier 84. A capacitor 85 and a transmission gate 86 are connected in parallel between the input of the amplifier 84 and ground.

The output of the amplifier 84 is connected to its inverting input and the gain of that amplifier is therefore equal to one. Its output is also connected by way of a transmission gate 87 to a first terminal of a capacitor 88. The other terminal of the capacitor 88 is connected to ground. Finally, the first terminal of the capacitor 88 is connected by way of a transmission gate 89 to the inverting input of the amplifier 74.

The transmission gates 77 and 89 are controlled by the above-described signal C1 at the same time as the gates 61, 70,71 and 73. The gates 76 and 87 are controlled by the signal C2 which is also described above, like the gates 64, 65 and 69. The gates 80 and 86 are controlled by a signal C3 which may be supplied for example by the circuit 9 for controlling the motor 10 and which is at logic state "0" during the driving pulses and at logic state "1" for the rest of the time. The gates 80 and 86 are therefore conducting between the driving pulses and non-conducting during the driving pulses. Finally, the gate 83 is controlled by a signal C4 which is normally at logic state "0" and which goes to logic state "1" for a few microseconds about 1 millisecond after the beginning of the driving pulse. The signals C3 and C4 are also shown in FIG. 10.

The mode of operation of the circuit between the output of the amplifier 20 and the terminal B1 is identical to that of the circuit shown in FIG. 9. However, because the second terminal of the capacitor 66 is connected to the ground of the circuit and not to the voltage $U_a$, the capacitor 66 is charged to the voltage $-U_x$ and not the voltage $(U_a-U_x)$ in response to the signal C2. The expression for the charge Q66 therefore becomes:

$$Q66=C66(-U_x)$$

Above-indicated equation (11) in which the term $U_a$ is replaced by zero shows that the voltage $U_{m2}$ which would appear at the terminal B1 in response to the signal C1 if the elements 74 to 89 did not exist would be as follows:

$$U_{m2} = \frac{1}{1+\frac{\Delta t}{\tau}}\left(-U_x\frac{\Delta t}{\tau} + U_x - U_y\right) \qquad (12)$$

Comparison between that equation (12) and equation (11) above shows that:

$$U_{m2} = U_{m1} - \frac{1}{1+\frac{\Delta t}{\tau}} U_a \frac{\Delta t}{\tau}$$

It should be noted that, as long as the rotor is stationary, that is to say, between the driving pulses and at the beginning thereof, the voltage $U_{m1}$ is zero. The voltage $U_{m2r}$ which would appear at the terminal B1 under those conditions would therefore be as follows:

$$U_{m2r} = -\frac{1}{1+\frac{\Delta t}{\tau}} U_a \frac{\Delta t}{\tau} \qquad (13)$$

The mode of operation of the circuit formed by the components 74 to 89 is as follows:

Between the driving pulses, the signal C3 is at "1". The capacitors 79 and 85 are therefore short-circuited by the gates 80 and 86 which are conducting. The output of the amplifier 78, which is output of the measuring circuit, and the output of the amplifier 84, are at ground potential.

The capacitor 88 is discharged since the output of the amplifier 84 which is connected to ground is connected thereto at each pulse C2 by the gate 87.

At each pulse C2, the capacitor 75 is also discharged by the gate 76 which short-circuits it. Immediately after each of the pulses C2, the output of the amplifier 74 is therefore also at ground potential.

A moment Δt after each of the pulses C2, a pulse C1 switches the gates 70, 71, 73, 77 and 89 into a conducting condition. The sum of the charges contained at that moment in the capacitors 66, 67 and 88 therefore transferred into the capacitor 75. The voltage U75 at the terminals of the capacitor 75 would then be:

$$U75 = -\frac{Q66+Q67+Q88}{C75}$$

if the gate 80 were not conducting. The sign—which appears in the foregoing equation is because the terminal B1 is connected to the inverting input of the amplifier 74.

In actual fact, the voltage U75 remains zero as long as the signal C3 is at state "1" and the charges Q66 and Q67 are transmitted to ground by way of the gate 80. The charge Q88 on the capacitor 88 is in any case zero at that moment. The output of the amplifier 78 therefore remains at ground potential.

At the beginning of each driving pulse, the signal C3 goes to state "0" and remains at that state. The gates 80 and 86 are therefore non-conducting.

The above-described procedure starts again at the first pulse C1 following the beginning of the driving pulse but this time the capacitor 79 is charged to the above-defined voltage U75. The gate 83 is still non-conducting, with the result that the output voltage of the amplifier 84 does not change and the capacitor 88 remains discharged. The voltage U75 referred to above therefore becomes equal to:

$$U75 = -\frac{Q66+Q67}{C75}$$

As $Q66=C66(-U_x)$ and $Q67=C67(U_x-U_y)$, the foregoing expression can be written as follows:

$$U_{75} = -\frac{C66\,(-U_x) + C67\,(U_x - U_y)}{C75}$$

At the moment D of the last pulse C1 preceding the pulse C4, the value of the voltage U75 is:

$$U75_D = -\frac{C66\,(-U_{xD}) + C67\,(U_{xD} - U_{yD})}{C75}$$

in which $U_{xD}$ and $U_{yD}$ are the values of $U_x$ and $U_y$ at the moment D.

The pulse C4 is produced approximately one millisecond after the beginning of the driving puls, at a moment at which the rotor is still stationary. The pulse C4 briefly opens the gate 83. The capacitor 85 is therefore charged to the voltage U75D which also appears at the output of the amplifier 84. The pulse C2 following the pulse C4 opens the gate 87 and the capacitor 88 is therefore also charged to the voltage U75D. The electrical charge Q88 on the capacitor 88 therefore becomes equal to:

$$Q88 = -C88\frac{C66\,(-U_{xD}) + C67\,(U_{xD} - U_{yD})}{C75}$$

It should be noted that the capacitor 85 in practice remains charged to the voltage U75 as long as the gate 86 is non-conducting if the input resistance of the amplifier 84 is high, which is the case. The subsequent changes in the output voltage of the amplifier 74 no longer have any influence on that voltage since the gate 83 is again permanently non-conducting.

On each following pulse C1, the capacitor 88 is discharged into the capacitor 75 at the same time as the capacitors 66 and 67. The charge on the capacitor 75 therefore becomes:

$$Q75 = Q66 + Q67 + Q88$$

It should also be noted that, at each pulse C2, the capacitor 88 is charged again to the voltage U75D which is stored by the capacitor 85.

At any moment after the pulse C4, it is therefore possible to write the following:

$$Q75 = C66\,(-U_x) + C67\,(U_x - U_y) - C88\frac{C66\,(-U_{xD}) + C67\,(U_{xD} - U_{yD})}{C75}$$

If C88=C75, and if, as above, $C66 = C67(\Delta t/\tau)$, that equation becomes:

$$Q75 = C67\left(-U_x\frac{\Delta t}{\tau} + U_x - U_y + U_{xD}\frac{\Delta t}{\tau} - U_{xD} + U_{yd}\right)$$

The voltage U75, which is equal to (Q75/C75), can therefore be written as follows:

$$U75 = \frac{C67}{C75}\left(-U_x\frac{\Delta t}{\tau} + U_x - U_y + U_{xD}\frac{\Delta t}{\tau} - U_{xD} + U_{yD}\right) \quad (14)$$

The voltage U75 is independent of the voltage $U_a$ or the voltage $U_a'$. In addition, it is proportional to the voltage $U_{rx}$ induced in the coil of the motor at the moment $t_x$ by rotation of the rotor. In fact, at the moment D defined hereinbefore, the voltage $U_{m2}$ given by equation (12) is written as follows:

$$U_{m2} = -\frac{1}{1 + \frac{\Delta t}{\tau}}\left(U_{xD}\frac{\Delta t}{\tau} - U_{xD} + U_{yD}\right)$$

Equation (14) above can therefore be written as follows:

$$U75 = \frac{C67}{C75}\left[-U_x\frac{\Delta t}{\tau} + U_x - U_y - \left(1 + \frac{\Delta t}{\tau}\right)U_{m2}\right] \quad (15)$$

The rotor being stationary at the moment D, the voltage $U_{m2}$ is equal to the voltage $U_{m2r}$ defined by the above equation (13).

By replacing the term $U_{m2}$ in equation (15) by the value of $U_{m2r}$ taken from equation (13) that equation (15) can be written as follows:

$$U75 = \frac{C67}{C75}\left(-U_x\frac{\Delta t}{\tau} + U_x - U_y + U_a\frac{\Delta t}{\tau}\right) \quad (16)$$

Comparison of equation (16) with equation (11) shows that:

$$U75 = \frac{C67}{C75}\left(1 + \frac{\Delta t}{\tau}\right)U_{m1}$$

With the voltage $U_{m1}$ being proportional to the voltage $U_{rx}$, the voltage U75 is also so proportional.

If the capacitance C75 is made equal to $$C67\left(1 + \frac{\Delta t}{\tau}\right),$$

then $U75 = U_{m1}$.

It is clear however, that a different ratio may be selected between the capacitance C75 and the capacitances C67 and C88. Likewise, the gain of the amplifiers 74 and 84 can be different from one. In any case, the voltage U75 will remain proportional to $U_{m1}$ and therefore to the voltage $U_{rx}$ induced at the moment $t_x$ in the coil of the motor by rotation of the rotor.

It should be noted that, since the non-inverting input of the amplifier 75 is connected to ground, the capacitors 66, 67 and 88 are completely discharged into the capacitor 75 upon each pulse C1. At each pulse C2, the capacitor 75 is short-circuited by the gate 76 and the above-calculated voltage U75 falls back to zero. The capacitor 79 which is charged to the voltage U75 at each pulse C1 is provided for storing that voltage between two successive pulses C1. The voltage U75 stored by the capacitor 79 is amplified by the amplifier 78 by a factor which may be freely fixed by selection of the ratio between the values of the resistors 81 and 82. The output voltage U78 of the amplifier 78 is also proportional to the voltage $U_{rx}$ and may therefore form the voltage $U_m$ applied to the comparison circuit 12 in FIG. 4. The reference voltage $U_s'$ which is applied in that case to the circuit 12 must obviously be selected in accordance with the characteristics of the various components of the circuit shown in FIG. 11, in particular the capacitances of the various capacitors and the gains of the amplifiers.

Figure 12:
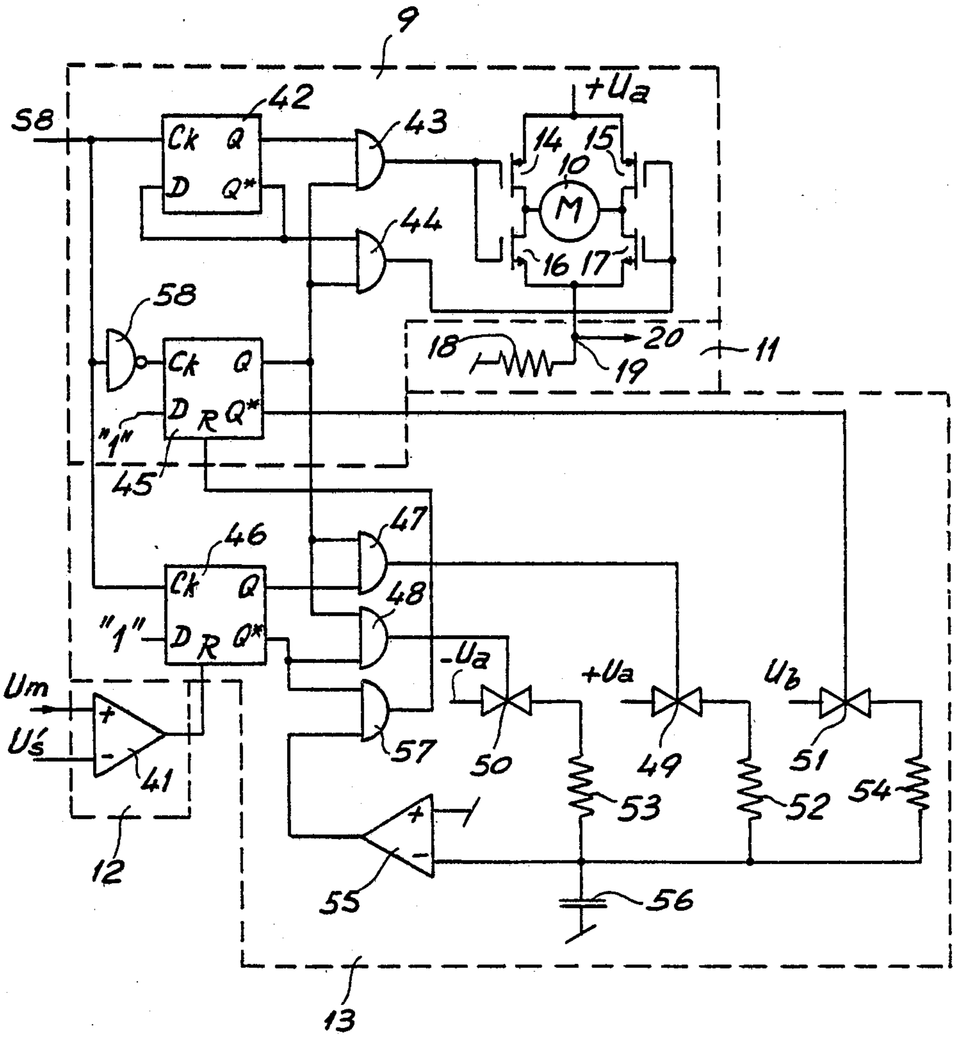
FIG. 12 is a diagram of a first embodiment of a circuit for using measurement of the voltage induced in the coil by rotation of the rotor to interrupt the driving pulse.

FIG. 12 shows an example of a circuit for performing the function of the circuit 9, 12 and 13 shown in FIG. 4. In this example, the circuit 12 is formed by a separate source or by a simple voltage divider connected to the terminals of the source supplying power to the entire circuit.

In FIG. 12, the control circuit 9 for controlling the motor 10 comprises the transistors 14 to 17 described with reference to FIG. 6. It further comprises a D-type flip-flop 42, the clock input Ck of which is connected to the output S8 of the circuit 8 shown in FIG. 4. The D input of the flip-flop 42 is connected to its inverted output Q* so that it changes state whenever the signal S8 goes from logic state "0" to logic state "1". The direct output Q of the flip-flop 42 is connected to a first input of an AND-gate 43, the output of which is connected to the gates of the transistors 14 and 16. The Q* output of the flip-flop 42 is connected to a first input of an AND-gate 44, the output of which is connected to the gates of the transistors 15 and 17.

The control circuit 9 further comprises a D-type flip-flop 45, the clock input Ck of which is connected to the output S8 of the circuit 8 by way of an inverter 58.

The D input of the flip-flop is permanently at logic state "1" and the Q output thereof is connected to the second input of the gates 43 and 44.

The calculating circuit 13 comprises a flip-flop 46 which is also of D type and the clock input Ck of which is connected to the output S8 of the circuit 8, while the D input thereof is permanently at logic state "1". The Q and Q* outputs of the flip-flop 46 are respectively connected to the first inputs of two AND-gates 47 and 48, the second inputs of which are both connected to the Q output of the flip-flop 45.

The resetting input R of the flip-flop 46 is connected to the output of the differential amplifier 41.

Three transmission gates 49, 50 and 51 have their control inputs respectively connected to the outputs of the gates 47 and 48 and to the Q* output of the flip-flop 45. The gates 49, 50 and 51 are similar to the gate 21 in FIG. 6. When their control input is at logic state "0", they are in their non-conducting condition while when their control input is at logic state "1", they are in their conducting condition.

The gate 49 is connected between the positive terminal $+U_a$ of the power source and a resistor 52 having a resistance R52.

The gate 50 is connected between the negative terminal $-U_a$ of the power source and a resistor 53 having a resistance R53.

Finally, the gate 51 is connected between a voltage $U_b$ which will be defined hereinafter and a resistor 54 having a resistance R54.

The second terminals of the resistors 52, 53 and 54 are connected together and to the inverting input of a differential amplifier 55, the non-inverting input of which is connected to a given voltage, which is that of ground in the present example.

A capacitor 56 having a capacitance C56 is connected between the common point of the resistors 52 to 54 and ground.

The output of the amplifier 55 is connected to a first input of an AND-gate 57, the second input of which is connected to the Q* output of the flip-flop 46. The output of the gate 57 is connected to the resetting input R of the flip-flop 45.

The mode of operation of this circuit will now be described with reference to the diagram shown in FIG. 13. In the reset condition, the Q outputs of the flip-flops 45 and 46 are at state "0". The outputs of the gates 43, 44, 47 and 48 are therefore also at "0". The transistors 14 and 15 are therefore conducting, which short-circuits the coil of the motor 10. The transistors 16 and 17 are non-conducting. The gates 49 and 50 are non-conducting while the gate 51 is put into its conducting condition by state "1" present at the Q* output of the flip-flop 45.

The voltage U56 at the terminals of the capacitor 56 is therefore equal to the voltage $U_b$. If that voltage is positive, as in this example, the outputs of the amplifier 55 and the gate 57 are at "0".

If the voltage $U_b$ is negative, the output of the amplifier 55 and the output of the gate 57 are at "1".

As the rotor of the motor 10 is stationary, the voltage U22 is zero and the output of the amplifier 41 is at "0".

For the purpose of the present explanation, it will be assumed that the Q output of the flip-flop 42 is at "0" for the moment and that the output signal S8 of the circuit 8 goes to state "1" for a few microseconds whenever the motor is to advance by one step.

As soon as the signal S8 goes to state "1", at the moment t0, the Q outputs of the flip-flops 42 and 46 go to state "1".

The output of the gate 57 therefore goes to state "0", even if the output of the amplifier 55 is at state "1" at that moment.

When the signal S8 goes to "0" again, a few microseconds later, the Q output of the flip-flop 45 also goes to state "1".

The output of the gate 43 therefore also goes to state "1". The transistor 14 is non-conducting and the transistor 16 is switched into the conducting condition. The current i begins to flow in the coil of the motor 10, through the transistors 15 and 16. The voltage at point 19 begins to rise and to act on the measuring circuit 11, as described above with reference to FIGS. 6, 9 or 12.

At the same time, the Q* output of the flip-flop 45 goes to state "0", which causes the gate 51 to become non-conducting. The output of the gate 47 goes to state "1", which switches the gate 49 into a conducting condition. The voltage $+U_a$ is therefore applied to the capacitor 56 by way of the resistor 52 and the voltage U56 begins to rise on an exponential curve having a time constant $\tau 1$ which ist determined by the product R52.C56. In order to simplify the drawing, the variation in the voltage U56 is shown in FIG. 13 as a linear variation.

When, at moment $t_d$, the voltage U22 exceeds the threshold voltage Us', the output of the amplifier 41 goes to state "1". The Q output of the flip-flop 46 therefore goes back to state "0", which causes the gate 49 to become non-conducting. The value $U_d$ attained by the voltage U56 at the moment $t_d$ depends on the time T2 taken by the induced voltage $U_r$ to reach the threshold voltage $U_s$, on the value of the voltage $U_b$ and on the time constant $\tau 1$.

At the same moment $t_d$, the Q* output of the flip-flop 46 goes to state "1", which switches the gate 50 into a conducting condition. The voltage $-U_a$ is therefore now applied to the capacitor 56 by way of the resistor 53. The voltage U56 therefore begins to fall, from the value $U_d$, with a time constant $\tau 2$ which is determined by the product R53.C56.

When, at moment $t_i$, the voltage U56 becomes equal to a given voltage which is the voltage of ground in the present example, the output of the amplifier 55 goes to state "1", which switches the flip-flop 45 into its rest condition, that is to say, with its Q output at "0" and its Q* output at "1". The output of the gate 43 therefore goes back to state "0", which switches the transistor 16 into a non-conducting condition and causes the transistor 14 to conduct. The current i is therefore interrupted and the rotor of the motor terminates its stepping motion by virtue of its inertia and by virtue of a part of the energy which is stored in the form of magnetic energy in the inductance of the coil. The rotor is braked by the short-circuit which occurs through the transistors 14 and 15.

The time T3 taken $t_y$ the voltge U56 to become equal to zero depends on the voltage $U_d$ that it has attained at the moment $t_d$ and on the time constant $\tau 2$.

The duration T1 of the driving pulse is equal to the sum of the durations T2 and T3. As T3 depends on the voltage $U_d$ and as that voltage $U_d$ itself depends on the duration T2, it will be seen that the duration T1 directly depends on the time T2 taken by the voltage $U_r$ induced in the coil of the motor by rotation of the rotor to reach a predetermined value $U_s$.

As the duration T01 of the driving pulse required to cause the motor to rotate without load, the time T02 taken by the induced voltage $U_r$ to reach the value $U_s$ when the motor is also without load, and the coefficient a and b of the straight lines which represent the variation in dependence on the load of the motor of the duration of the driving pulse and of the time taken by the voltage $U_r$ to reach the threshold $U_s$ are known by means of tests, as described hereinbefore, it is easy to determine the time constants $\tau 1$ and $\tau 2$ and the voltage $U_b$ in such a way as to verify the above-mentioned relationship (1). It is therefore in the form of those parameters $\tau 1$, $\tau 2$ and $U_b$ that the constants k and K in the relationship (1) are introduced in the present embodiment of the calculating circuit 13. The voltage $U_b$ can be selected as a negative voltage, if necessary, to take account of the sign of the constant K.

At the moment $t_i$, the state "0" of the Q output of the flip-flop 45 causes the gate 50 to be in a non-conducting condition. The state "1" of the Q* output of the flip-flop 45 switches the gate 51 into a conducting condition. The voltage $U_b$ is therefore again applied to the capacitor 56 through the resistor 54. The voltage U56 therefore rises again until, after a certain period of time, it reaches the voltage $U_b$.

As soon as the voltage U56 becomes positive again, the output of the amplifier 55 goes back to state "0". That output therefore remains at state "1" only for a very short time.

A certain time after the moment $t_d$, the voltage U22 falls back below the voltage $U_s'$. The output of the amplifier 41 therefore goes back to state "0". That period of time, which does not play any part in operation of the circuit, depends on the mechanical load which is driven by the motor and the value of the voltage $U_s'$.

When the signal S8 goes again to "1", the above-described procedure begins again, with the only difference that this time, it is the Q* output of the flip-flop 42 and therefore the output of the gate 44 which go to state "1". The transistor 15 becomes non-conducting and the transistor 17 conducting, causing the current i to flow in the direction opposite to its direction of flow in the previous situation.

Figure 14:
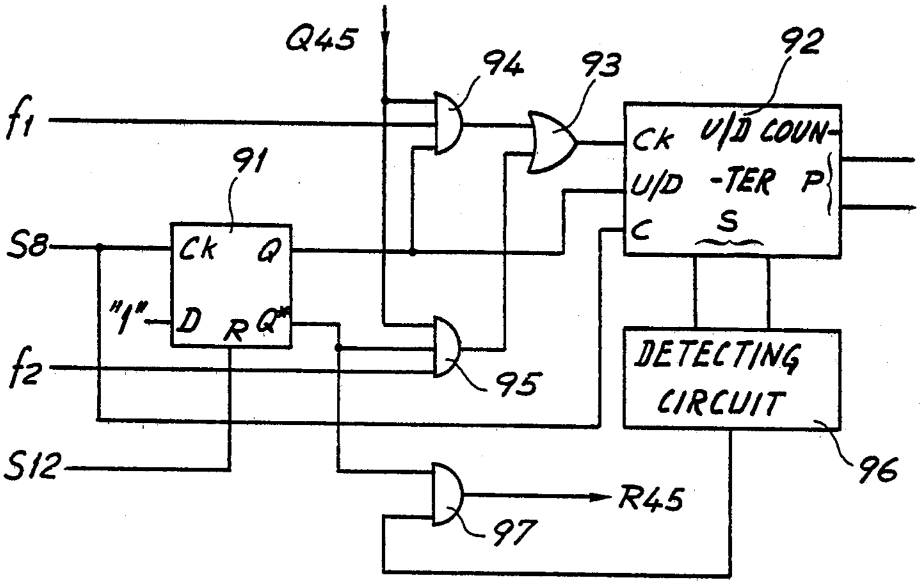
FIG. 14 is a diagram of a second embodiment of a circuit using measurement of the voltage induced in the coil by rotation of the rotor to interrupt the driving pulse.

FIG. 14 shows another embodiment of the circuit for performing the function of the calculating circuit 13 shown in FIG. 4.

The circuit shown in FIG. 14 comprises a D-type flip-flop 91, the clock input Ck of which receives the output signal S8 of the circuit 8 shown in FIG. 4. The D input of the flip-flop 91 is permanently at logic state "1". Its Q output is connected to the U/D input of an up-down counter 92. The logic state "1" or "0" of that input U/D determines whether counter 92 is incremented or decremented by pulses it receives on its input Ck as described hereinafter. The counter 92 is also preselectable, which means that, in response to a pulse at a control input C, the content thereof assumes a value which is determined by logic states "0" or "1" which are applied to preselection inputs generally denoted by P.

The control input of the counter 92 is also connected to the output S8 of the circuit 8 and its inputs P are connected, in a fixed or modifiable manner which will be described hereinafter, to the potentials representing logic state "0" and "1".

The clock input Ck of the counter 92 is connected to the output of an OR-gate 93, the inputs of which are respectively connected to the outputs of two AND-gates 94 and 95.

The inputs of the gate 94 are respectively connected to the Q output of the flip-flop 45 in FIG. 12 (not shown in FIG. 14), to the Q output of the flip-flop 91 and to a circuit (also not shown) which supplies a periodic signal at a frequency f1. That circuit may be the circuit 8 shown in FIG. 4 and the frequency f1 is selected in a manner to be described hereinafter.

The inputs of the gate 95 are respectively connected to the Q output of the flip-flop 45, the Q* output of the flip-flop 91 and to a circuit which may also be the circuit 8 shown in FIG. 4 and which produces a periodic signal at a frequency f2, the choice of which will also be described hereinafer.

The outputs of the counter 92, which are generally denoted by S, are connected to a detecting circuit 96, the output of which is at state "1" when the content of the counter 92 is equal to zero. The circuit 96 may be simply formed by an inverted OR-gate, each input of which is connected to an output of the counter 92.

The output of the circuit 96 is connected to an input of an AND-gate 97, the other input of which is connected to the Q* output of the flip-flop 91.

Finally, the output of the gate 97 is connected to the resetting input R of the flip-flop 45 shown in FIG. 12 (but not shown in FIG. 14).

Figure 15:
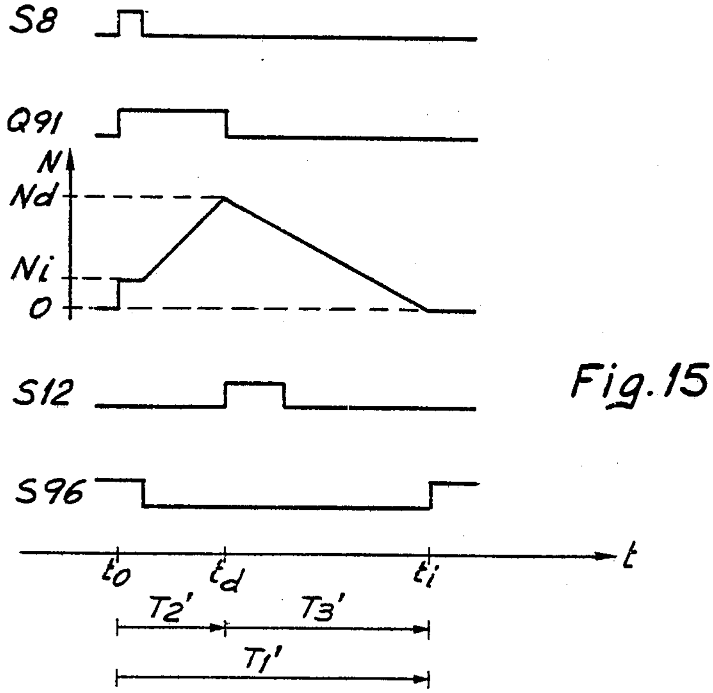
FIG. 15 illustrates the mode of operation of the circuit of FIG. 14.

The mode of operation of this circuit, which is illustrated in FIG. 15, is as follows:

When the signal 8 goes to state "1", the content N of the counter 92 assumes a value $N_i$ which is imposed thereon by the state of its inputs P. At the same time, the Q output of the flip-flop 91 goes to state "1".

When, at the end of the pulse S8, the Q output of the flip-flop 45 goes to state "1", the pulses at a frequency f1 pass through the gates 94 and 93 and begin to increment the content of the counter 92, starting from the value $N_i$ that the counter content assumed in response to the signal S8.

At the end of the period of time T2', the induced voltage measured by the circuit 12 reaches the value of the reference voltage and the output S12 goes to state "1". The Q output of the flip-flop 91 therefore goes to state "0" and its Q* output goes to state "1".

The value $N_d$ of the content of the counter 92 at that moment depends on the time T2' taken by the induced voltage $U_r$ to reach the threshold voltage $U_s$, the initial value $N_i$ assumed by the content of the counter 92 in response to the signal S8, and the frequency f1.

With the Q* output of the flip-flop 91 being maintained at state "1", the pulses at a frequency f2 pass through the gates 95 and 93 and begin to decrement the content of the counter 92, from the above-indicated value $N_d$.

When the content of the counter 92 reaches the value zero, the output of the detecting circuit 96 and the output of the gate 97 go to state "1", which sets the Q output of the flip-flop 45 to "0". The driving pulse which had begun at the end of the signal S8 is thus interrupted.

The time T3' taken by the counter 92 to reach the state zero depends on the value $N_d$ which is reached by the counter content at the moment at which the output S12 of the circuit 12 goes to state "1", and the frequency f2.

Figure 13:
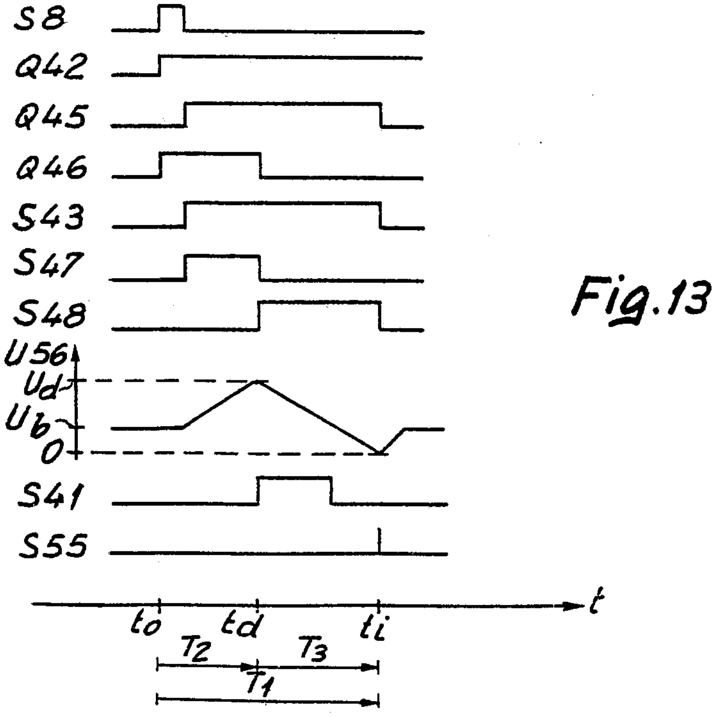
FIG. 13 illustrates the mode of operation of the circuit of FIG. 12.

In a similar manner to the situation shown in FIG. 13, the duration T1' of the driving pulse is equal to the sum of the durations T2' and T3'. As the duration T3' depends on the value $N_d$ and as that value $N_d$ itself depends on the duration T2', the duration T1' of the driving pulse depends directly on the time T2' taken by the voltage $U_r$ induced in the coil of the motor by rotation of the rotor to reach the predetermined value $U_s$.

In this case, the frequencies f1 and f2 play the part of the time constants $\tau 1$ and $\tau 2$ of the embodiment shown in FIG. 12, and the initial value $N_i$ plays the part of the voltage $U_b$.

The frequencies f1 and f2 and the initial value $N_i$ must therefore be determined by the same tests as those required for determining the time constants $\tau 1$ and $\tau 2$ and the voltage $U_b$ in the embodiment shown in FIG. 9, in order for the above-mentioned relationship (1) to be verified. It is in the form of the frequencies f1 and f2 and the initial value $N_i$ that the constants k an K of relationship (1) are introduced in this embodiment of the calculating circuit 13.

If necessary, depending on the sign of the constant K, a negative initial value $N_i$ should be introduced into the counter 92. As the value of the content of a counter is always a positive number, in this case an initial value $N_i'$ which is equal to the difference between the counting capacity of the counter 92 and the absolute value of $N_i$ must be introduced into the counter.

In this case, the content of the counter 92 passes through zero after $N_i$ pulses at a frequency f1 have been received by its input Ck. However, as the Q* output of the flip-flop 91 is still at state "0" at that moment, the signal "1" supplied by the output of the circuit 96 is blocked by the gate 97. The drive pulse is therefore not interrupted at that moment.

It will be appreciated that the above-described circuit only constitute examples of circuits for carrying the invention into effect. Other circuits for measuring the voltage $U_r$ could be designed. Likewise, the information provided by the measurement operation could be utilised in a different manner. Finally, even where the above-mentioned information is supplied by the time taken by the voltage $U_r$ to exceed a given threshold $U_s$, the calculating circuit 13 could be of a different design.

However, these differences in the mode of performing the invention would not constitute a departure from the scope thereof.

It should also be noted that it would be possible for the relationship (1) between the minimum duration of the drive pulse and time T2 taken by the voltage $U_r$ to exceed the threshold voltage $U_s$ not to be linear. However, even in that case, it could be defined by a few tests. The calculating circuit 13 would simply have to be designed in such a way as to perform the desired function.

What we claim is:

1. A method for reducing the power consumption of a stepping motor of the type having a coil and a rotor magnetically coupled to the coil and rotated in response to driving pulses applied to the coil, comprising the steps of:

measuring during each driving pulse the voltage induced in the coil by the rotation of the rotor;

measuring the time interval between the beginning of the driving pulse and the moment at which the induced voltage becomes equal to a reference voltage; and, terminating the driving pulse according to said period of time whereby said driving pulses have a duration which relates to a load on said motor.

2. The method of claim 1 wherein said induced voltage measuring step comprises the steps of:

producing a first voltage proportional to the current flowing in the coil;

producing a second voltage proportional to the current which would flow in the coil in the absence of an induced voltage;

producing a third voltage proportional to the difference between the second and first voltages; and periodically making the second voltage equal to the first voltage, whereby the envelope of the successive maxima of the third voltage is proportional to the induced voltage.

3. The method of claim 1 wherein said induced voltage measuring step comprises the steps of:

producing a first voltage proportional to the difference between a first current flowing in the coil at a first moment and a second current flowing in the coil at a second subsequent moment, producing a second voltage proportional to the difference between a third current which would flow in the coil at the second moment in the absence of any induced voltage between said first and second moments and the first current, and producing a third voltage proportional to the sum of the first and second voltages, the third voltage being proportional to the induced voltage.

4. The method of claim 1 wherein said induced voltage measuring step comprises the steps of:

producing a first voltage proportional to the difference between a first current flowing in the coil at a first moment and a second current flowing in the coil at a second subsequent moment, producing a second voltage proportional to the current flowing in the coil at the first moment, producing a third voltage proportional to the sum of the first and second voltages at a moment which is subsequent to the beginning of the driving pulse and before the beginning of the rotation of the rotor, and producing a fourth voltage proportional to the sum of the first, second and third voltages, the fourth voltage being proportional to the induced voltage.

5. The method of claim 1 wherein said time measuring step comprises:

charging a capacitor with a first current from the beginning of the driving pulse to the moment at which the induced voltage becomes equal to the reference voltage; and the terminating step comprises:

discharging the capacitor with a second current from said moment and terminating said pulse when the voltage of said capacitor reaches a predetermined value.

6. The method of claim 5 wherein said period of time measuring step further comprises the step of charging the capacitor to an initial voltage different from said predetermined voltage before charging it with said first current.

7. The method of claim 1 wherein said time measuring step comprises:

incrementing a counter at a first frequency from the beginning of the driving pulse to the moment at which the induced voltage becomes equal to the reference voltage; and the terminating step comprises:

decrementing the counter at a seconed frequency from said moment, the driving pulse being terminated when the counter reaches a predetermined count.

8. The method of claim 7 wherein said period of time measuring step further comprises the step of setting the counter in an initial count which is different from said predetermined count before incrementing the counter.

9. A device for controlling a stepping motor of the type having a coil and a rotor magnetically coupled to the coil and rotated in response to driving pulses applied to the coil, comprising:

means for measuring during each driving pulse the voltage induced in the coil by the rotation of the rotor;

means for measuring the time interval between the beginning of the driving pulse and the moment at which the induced voltage becomes equal to a reference voltage; and means for terminating the driving pulse according to said interval.

10. The device of claim 9 wherein said induced voltage measuring means comprises:

means for producing a first voltage proportional to the current flowing in the coil;

means for producing a second voltage proportional to the current which would flow in the coil in the absence of an induced voltage;

means for producing a third voltage proportional to the difference between the second and first voltages; and means for periodically making the second voltage equal to the first voltage, whereby the envelope of successive maxima of the third voltage is proportional to the induced voltage.

11. The device of claim 9 wherein said induced voltage measuring means comprises:

means for producing a first voltage proportional to the difference between a first current flowing in the coil at a first moment, and a second current flowing in the coil at a second subsequent moment;

means for producing a second voltage proportional to the difference between a third current which would flow in the coil at the second subsequent moment in the absence of any induced voltage between first and second moments and the first current; and means for producing a third voltage proportional to the sum of the first and second voltages, the third voltage being proportional to the induced voltage.

12. The device of claim 9 wherein said induced voltage measuring means comprises:

means for producing a first voltage proportional to the difference between a first current flowing in the coil at a first moment and a second current flowing in the coil at a second subsequent moment;

means for producing a second voltage proportional to the current flowing in the coil at the first moment;

means for producing a third voltage proportional to the sum of the first and second voltages at a moment which is subsequent to the beginning of the driving pulse and before the beginning of the rotation of the rotor; and means for producing a fourth voltage proportional to the sum of the first, second and third voltages, the fourth voltage being proportional to the induced voltage.

13. The device of claim 9 wherein said time measuring means comprises:

a capacitor;

means for charging the capacitor with a first current from the beginning of the driving pulse to the moment at which the induced voltage becomes equal to the reference voltage; and the interrupting means comprises:

means for discharging said capacitor with a second current from said moment; and means for terminating the driving pulse when the voltage of said capacitor reaches a predetermined value.

14. The device of claim 13 wherein said time measuring means further comprises:

means for charging the capacitor to an initial voltage different from said predetermined voltage before charging it with said first current.

15. The device of claim 9 wherein said time measuring means comprises:

a counter;

means for incrementing said counter at a first frequency from the beginning of the driving pulse to the moment at which the induced voltage becomes equal to the reference voltage;

said interrupting means comprises:

means for decrementing said counter at a second frequency from said moment; and means for terminating the driving pulse when said counter reaches a predetermined count.

16. The device of claim 15 wherein said period of time measuring means further comprises means for setting said counter in an initial count which is different from said predetermined count before incrementing said counter.

* * * * *